United States Patent
Izumi et al.

(10) Patent No.: US 10,927,198 B2
(45) Date of Patent: Feb. 23, 2021

(54) METHACRYLIC ACID ESTER POLYMER, METHOD FOR PRODUCING SAME, ACTIVE ENERGY RAY-CURABLE COMPOSITION, AND OPTICAL RECORDING MEDIUM

(71) Applicant: Mitsubishi Rayon Co., Ltd., Chiyoda-ku (JP)

(72) Inventors: Shinichirou Izumi, Toyohashi (JP); Mitsuhiro Matsuo, Otake (JP); Masahiko Morooka, Yokohama (JP); Kazuyoshi Odaka, Toyohashi (JP); Seiji Nushi, Chiyoda-ku (JP); Kana Akeda, Toyohashi (JP); Eri Kawai, Toyohashi (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 268 days.

(21) Appl. No.: 14/365,570

(22) PCT Filed: Dec. 14, 2012

(86) PCT No.: PCT/JP2012/082558
§ 371 (c)(1),
(2) Date: Jun. 13, 2014

(87) PCT Pub. No.: WO2013/089245
PCT Pub. Date: Jun. 20, 2013

(65) Prior Publication Data
US 2014/0349129 A1    Nov. 27, 2014

(30) Foreign Application Priority Data

Dec. 14, 2011    (JP) .............................. JP2011-273462

(51) Int. Cl.
| | |
|---|---|
| *C08F 18/14* | (2006.01) |
| *C08F 2/38* | (2006.01) |
| *C08F 220/14* | (2006.01) |
| *C08F 265/06* | (2006.01) |
| *C08F 290/06* | (2006.01) |
| *C08F 2/20* | (2006.01) |
| *C09D 151/00* | (2006.01) |
| *C09D 133/10* | (2006.01) |

(52) U.S. Cl.
CPC ............... *C08F 18/14* (2013.01); *C08F 2/20* (2013.01); *C08F 2/38* (2013.01); *C08F 220/14* (2013.01); *C08F 265/06* (2013.01); *C08F 290/062* (2013.01); *C09D 133/10* (2013.01); *C09D 151/00* (2013.01); *Y10T 428/31699* (2015.04)

(58) Field of Classification Search
CPC ....................................................... C08F 18/14
See application file for complete search history.

(56) References Cited

U.S. PATENT DOCUMENTS

| | | | | |
|---|---|---|---|---|
| 2,979,491 A * | 4/1961 | Piloni | ............. | C08F 14/06 526/193 |
| 3,615,972 A * | 10/1971 | Morehouse, Jr. | ........ | B01J 13/18 156/276 |
| 3,928,500 A * | 12/1975 | Kraft | ............. | C08F 259/04 525/261 |
| 4,526,945 A | 7/1985 | Carlson et al. | | |
| 4,677,173 A * | 6/1987 | Holle | ............. | C08F 2/20 526/193 |
| 4,680,352 A | 7/1987 | Janowicz et al. | | |
| 4,694,054 A | 9/1987 | Janowicz | | |
| 4,837,326 A | 6/1989 | Lin et al. | | |
| 4,886,861 A * | 12/1989 | Janowicz | ............. | C08F 2/38 526/145 |
| 5,028,677 A * | 7/1991 | Janowicz | ............. | C08F 290/04 526/273 |
| 5,324,879 A * | 6/1994 | Hawthorne | ............. | C08F 290/04 526/147 |

(Continued)

FOREIGN PATENT DOCUMENTS

| | | |
|---|---|---|
| CN | 1950401 A | 4/2007 |
| JP | 61-228006 A | 10/1986 |

(Continued)

OTHER PUBLICATIONS

Polyacrylic Acid MSDS, flyer, 1999.*
International Search Report dated Feb. 19, 2013 in PCT/JP2012/082558.
P. Cacioli, et al, "Copolymerization of w-unsaturated oligo(methyl methacrylate): New macromonomers", J. Macromol. Sci. Chem., vol. A23, No. 7, 1986, pp. 839-852.
Extended European Search Report dated May 7, 2015 in Patent Application No. 12857392.0.

(Continued)

*Primary Examiner* — Irina Krylova
(74) *Attorney, Agent, or Firm* — Oblon, McClelland, Maier & Neustadt, L.L.P.

(57) ABSTRACT

A cured product that is reduced in warping and has high hardness can be obtained from an active energy ray-curable resin composition which uses a methacrylic acid ester polymer that has an acid value of 50 mg KOH/g or less and a transition metal content of 1 ppm or less, while containing 80% by mole or more of a polymer that has a double bond-terminated structure represented by formula (1). (In formula (1), R represents an alkyl group, a cycloalkyl group or an aryl group.)

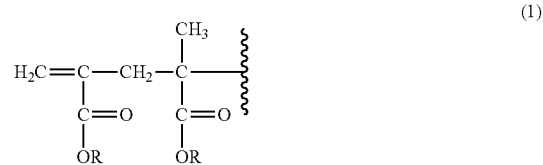

(1)

2 Claims, No Drawings

(56) References Cited

U.S. PATENT DOCUMENTS

| | | | | |
|---|---|---|---|---|
| 5,567,785 A | * | 10/1996 | Deckers | C08F 2/18 |
| | | | | 526/212 |
| 5,708,102 A | | 1/1998 | Fryd et al. | |
| 5,770,665 A | * | 6/1998 | Haddleton | C07F 5/022 |
| | | | | 526/131 |
| 5,962,609 A | | 10/1999 | Haddleton et al. | |
| 2007/0219328 A1 | | 9/2007 | Van Der Slot et al. | |
| 2012/0035316 A1 | | 2/2012 | Van Der Slot et al. | |

FOREIGN PATENT DOCUMENTS

| | | |
|---|---|---|
| JP | 61-241302 A | 10/1986 |
| JP | 06-023209 B2 | 3/1994 |
| JP | 07-035411 B2 | 4/1995 |
| JP | 07-316468 A | 12/1995 |
| JP | 09-510499 A | 10/1997 |
| JP | 10-508333 A | 8/1998 |
| JP | 2002-230831 A | 8/2002 |
| JP | 2003-085836 A | 3/2003 |
| JP | 2003-173568 A | 6/2003 |
| JP | 3587530 B2 | 11/2004 |
| JP | 2005-055717 A | 3/2005 |
| JP | 2005-281500 A | 10/2005 |
| JP | 2011-021070 A | 2/2011 |
| WO | WO 95/17435 A1 | 6/1995 |
| WO | WO 2005/105855 A1 | 11/2005 |
| WO | 2010/050256 | 5/2010 |

OTHER PUBLICATIONS

Combined Taiwanese Office Action and Search Report dated Sep. 4, 2015 in Patent Application No. 101147595 (with English language translation of categories of cited documents).

Examination Report as received in the Indian Patent Application No. 4379/CHENP/2014 dated Jul. 20, 2018 w/English Translation.

* cited by examiner

METHACRYLIC ACID ESTER POLYMER, METHOD FOR PRODUCING SAME, ACTIVE ENERGY RAY-CURABLE COMPOSITION, AND OPTICAL RECORDING MEDIUM

CROSS REFERENCE TO RELATED APPLICATIONS

The present application is a 35 U.S.C. § 371 national stage patent application of International patent application PCT/JP2012/082558, filed on Dec. 14, 2012, published as WO/2013/089245 on Jun. 20, 2013, the text of which is incorporated by reference, and claims the benefit of the filing date of Japanese application no. 2011-273462, filed on Dec. 14, 2011, the text of which is also incorporated by reference.

TECHNICAL FIELD

The present invention relates to a methacrylic acid ester polymer having reactive double bonds at the terminus, an active energy ray-curable resin composition using this methacrylic acid ester polymer, and an optical recording medium using this active energy ray-curable resin composition.

BACKGROUND ART

In recent years, methacrylic acid ester polymers having reactive double-bonds at the terminus have been drawing attention, and various methods have been proposed as production methods thereof. For example, Patent Documents 1 to 3 disclose methods for producing methacrylic acid ester polymers having reactive double bonds at the terminus by way of the Catalytic Chain Transfer Polymerization (CCTP) method, using a specific transition metal chelate complex. According to this method, it is possible to effectively obtain a methacrylic acid ester polymer for which the molecular weight is controlled by suspension polymerization method, or the like.

On the other hand, in recent years, as Digital Hi-Vision broadcasting spreads, the demand for high capacity optical recording media has been rising, and various studies have made progress in raising the density of information recording media. For example, high-capacity optical disks like Blu-Ray disks have been implemented, and are becoming commonplace. The Blu-Ray disk has a light transmission layer on an information recording face of the support substrate on which the information recording face is formed, and various methods have been proposed as methods for forming this light transmission layer. For example, Patent Document 4 discloses a method of forming a light transmission layer by coating a liquid-form active energy ray-curable resin composition by way of the spin coating method, followed by curing by exposing to active energy rays, and as the liquid-form active energy ray-curable resin composition used with this method, Patent Document 5 discloses a composition containing urethane acrylate, for example. However, although the cured product obtained by causing such a liquid-form active energy ray-curable resin composition containing urethane acrylate to cure is favorable in the aspect of warping being small, there has been margin for improvements in the aspect of hardness due to being comparatively soft.

[Patent Document 1] Japanese Unexamined Patent Application (Translation of PCT Application), Publication No. H10-508333

[Patent Document 2] Japanese Examined Patent Application Publication No. H06-23209

[Patent Document 3] Japanese Examined Patent Application Publication No. H07-35411

[Patent Document 4] Japanese Unexamined Patent Application, Publication No. 2003-85836

[Patent Document 5] Japanese Unexamined Patent Application, Publication No. 2002-230831

DISCLOSURE OF THE INVENTION

Problems to be Solved by the Invention

Therefore, as a component used in the active energy ray-curable resin composition, it has been considered to use methacrylic acid ester polymer of higher hardness than urethane acrylate. In this case, from the viewpoints of viscosity of the active energy ray-curable resin composition and warping from polymerization shrinkage, it has been considered to use a low molecular weight methacrylic acid ester polymer having a mass average molecular weight on the order of 3000 to 30000. However, when using a low molecular weight methacrylic acid ester polymer, a problem arises in that the hardness of the cured product of active energy ray-curable resin composition will decline and it becomes brittle. Therefore, a first object of the present invention is to provide an active energy ray-curable resin composition that can obtain a cured product having little warping (hereinafter referred to as "low warping property") and high hardness.

In addition, in the case of using an active energy ray-curable resin composition as the protective coating material for metal or the material of the light transmission layer of an optical recording medium such as a Blu-Ray disk, it has been demanded not to corrode under a high-temperature and high-humidity environment. Therefore, a second object of the present invention is to provide an active energy ray-curable resin composition that does not cause the metal to corrode under a high-temperature and high-humidity environment.

Although it is helpful to use a low molecular weight methacrylic acid ester polymer having reactive double bonds at the terminus in order to achieve this first object and second object, problems also arise in that the low molecular weight methacrylic acid ester polymers having reactive double bonds at the terminus described in Patent Documents 1 to 3 color to become yellow, and thus cannot be used depending on the application. Therefore, a third object of the present invention is to provide a methacrylic acid ester polymer having reactive double bonds at the terminus, which is a methacrylic acid ester polymer with little coloring.

Furthermore, a fourth object of the present invention is to provide a method for efficiently producing a methacrylic acid ester polymer having reactive double bonds at the terminus, which is a methacrylic acid ester polymer with little coloring.

Means for Solving the Problems

The objects can be achieved by the following first to fifteenth aspects of the invention.

According to a first aspect of the invention, a methacrylic acid ester polymer having an acid value of no higher than 50 mg KOH/g and transition metal content of no higher than 1 ppm, includes at least 80% by mole of a polymer having a terminal double-bond structure expressed by Formula (1).

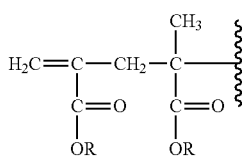
(1)

R in Formula (1) indicates an alkyl group, a cycloalkyl group or an aryl group.

According to a second aspect of the invention, in the methacrylic acid ester polymer as described in the first aspect, the mass average molecular weight is 3000 to 30000.

According to a third aspect of the invention, in the methacrylic acid ester polymer as described in the first or second aspect, the yellow index (YE) value is no more than 5.

According to a fourth aspect of the invention, a method for producing methacrylic acid ester polymer by suspension polymerizing methacrylic acid ester monomer in an aqueous medium includes: preparing an aqueous suspension containing water, methacrylic acid ester monomer, a transition metal chelate complex and a non-radical polymerizable acid and having a pH of 1 to 5; and subsequently polymerizing the methacrylic acid ester monomer.

According to a fifth aspect of the invention, in the method for producing methacrylic acid ester polymer as described in the fourth aspect, the transition metal chelate complex is a cobalt complex containing cobalt ion and having a nitrogen-containing ligand and/or an oxygen-containing ligand as a ligand.

According to a sixth aspect of the invention, in the method for producing methacrylic acid ester polymer as described in the fifth aspect, the transition metal chelate complex is at least one transition metal chelate complex selected from Formulas (2) to (7).

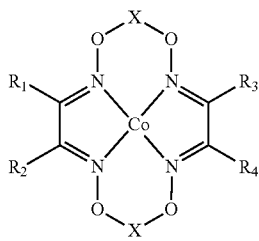
(2)

In Formula (2), $R_1$ to $R_4$ may each be the same or different, and represent a hydrogen atom, C6 to C12 aryloxy group, C1 to C12 alkyl group or C6 to C12 aryl group. Each X may be the same or different, X being H, $BF_2$, $BCl_2$, $BBr_2$ or $B(Y)_2$, where Y is a substituent selected from an OH group, C1 to C12 alkoxy group, C6 to C12 aryloxy group, C1 to C12 alkyl group and C6 to C12 aryl group.

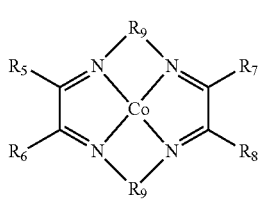
(3)

In Formula (3), $R_5$ to $R_8$ may each be the same or different, and represent a hydrogen atom, C6 to C12 aryloxy group, C1 to C12 alkyl group or C6 to C12 aryl group. $R_9$ may each be the same or different, and represents a C1 to C4 alkyl group.

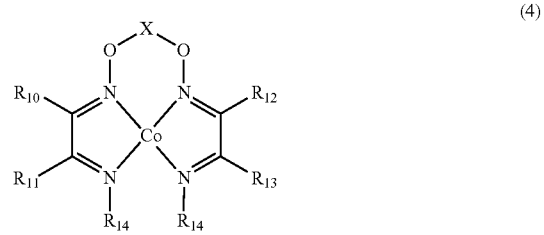
(4)

In Formula (4), $R_{10}$ to $R_{13}$ may each be the same or different, and represent a hydrogen group, C6 to C12 aryloxy group, C1 to C12 alkyl group or C6 to C12 aryl group. $R_{14}$ may each be the same or different, and represent a hydrogen atom or C1 to C4 alkyl. X is H, $BF_2$, $BCl_2$, $BBr_2$ or $B(Y)_2$, where Y is a substituent selected from an OH group, C1 to C12 alkoxy group, C6 to C12 aryloxy group, C1 to C12 alkyl group and C6 to C12 aryl group.

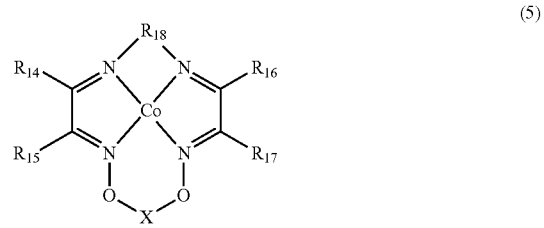
(5)

In Formula (5), $R_{14}$ to $R_{17}$ may each be the same or different, and represent a hydrogen atom, C6 to C12 aryloxy group, C1 to C12 alkyl group or C6 to C12 aryl group. $R_{18}$ is a C1 to C4 alkyl group. X is H, $BF_2$, $BCl_2$, $BBr_2$ or $B(Y)_2$, where Y is a substituent selected from an OH group, C1 to C12 alkoxy group, C6 to C12 aryloxy group, C1 to C12 alkyl group and C6 to C12 aryl group.

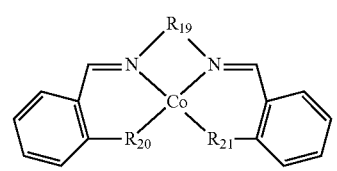
(6)

In Formula (6), $R_{19}$ represents a C1 to C4 alkyl group. $R_{20}$ and $R_{21}$ may each be the same or different, and represent an oxygen atom or NH group.

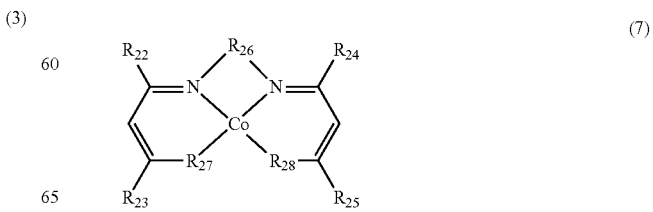
(7)

In Formula (7), $R_{22}$ to $R_{25}$ may each be the same or different, and represent a hydrogen atom, C6 to C12 aryloxy group, C1 to C12 alkyl group or C6 to C12 aryl group. $R_{26}$ represents a C1 to C4 alkyl group. $R_{27}$ and $R_{28}$ may each be the same or different, and represent an oxygen atom or NH group. According to a seventh aspect of the invention, an active energy ray-curable resin composition includes: 100 parts by mass of a resin composition including 5 to 50 parts by mass of methacrylic acid ester polymer having an acid value of no higher than 50 mg KOH/g and a transition metal content of no more than 1 ppm, and containing at least 80% by mole of a polymer having terminal double-bond structure represented by Formula (1), and 50 to 95% by mass of a radical-polymerizable compound including a compound having at least two (meth)acryloyl groups per molecule; and 1 to 20 parts by mass of a photopolymerization initiator.

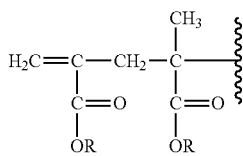
(1)

R in Formula (1) represents an alkyl group, a cycloalkyl group or an aryl group.

According to an eighth aspect of the invention, an active energy ray-curable resin composition includes: 100 parts by mass of a resin composition including 5 to 50 parts by mass of methacrylic acid ester polymer having an acid value of no higher than 50 mg KOH/g and a mass average molecular weight of 3000 to 30000, and 50 to 95% by mass of a radical-polymerizable compound including a compound having at least two (meth)acryloyl groups per molecule; and 1 to 20 parts by mass of a photopolymerization initiator, in which organic solvent content is no more than 1% by mass.

According to a ninth aspect of the invention, in the active energy ray-curable resin composition as described in the eighth aspect, the methacrylic acid ester polymer contains at least 80% by mole of a polymer having a terminal double-bonded structure represented by Formula (1).

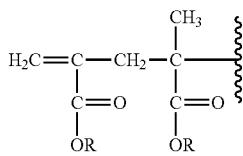
(1)

R in Formula (1) represents an alkyl group, a cycloalkyl group or an aryl group.

According to a tenth aspect of the invention, in the active energy ray-curable resin composition as described in any one of the seventh to ninth aspects, the compound having at least two (meth)acryloyl groups per molecule is a compound having two or three (meth)acryloyl groups per molecule.

According to an eleventh aspect of the invention, in the active energy ray-curable resin composition as described in any one of the seventh to tenth aspects, the radical-polymerizable compound further includes a compound having one (meth)acryloyl group per molecule.

According to a twelfth aspect of the invention, in the active energy ray-curable resin composition as described in any one of the seventh to eleventh aspects, the glass transition temperature of the methacrylic acid ester polymer is at least 50° C.

According to a thirteenth aspect of the invention, in the active energy ray-curable resin composition as described in any one of the seventh to twelfth aspects, the compound having at least two (meth)acryloyl groups per molecule includes at least one among tricyclodecane dimethanol di(meth)acrylate, neopentyl glycol-modified trimethylolpropane di(meth)acrylate, bisphenol A di(meth)acrylate modified by 4 to 6 alkylene oxides per molecule, and trimethylolpropane tri(meth)acrylate modified by 3 to 6 alkylene oxides per molecule.

According to a fourteenth aspect of the invention, an article includes a layer consisting of a cured product of the active energy ray-curable resin composition as described in any one of the seventh to thirteenth aspects on metal.

According to a fifteenth aspect of the invention, an optical recording medium includes a layer consisting of a cured product of the active energy ray-curable resin composition as described in any one of the seventh to thirteenth aspects.

Effects of the Invention

By using the methacrylic acid ester polymer of the present invention, it is possible to obtain a low-corrosiveness active energy ray-curable resin composition with low warping property having high hardness.

In addition, due to having little coloring, the methacrylic acid ester polymer of the present invention is suitable to applications for which little coloring is demanded.

In addition, due to having a transition metal amount of no more than 1 ppm, the methacrylic acid ester polymer of the present invention is suitable to applications for which few metal impurities are demanded.

The active energy ray-curable resin composition of the present invention is adaptable to coating and ink applications, particularly to resins for organic solvent-type coatings with high solids content, resins for solvent-free coatings, resins for photocurable coatings, resins for powder coatings and environmental conservation-type coatings for low VOC provision, and furthermore, to transparent members in the above-mentioned applications, transparent automotive members, transparent members for displays, etc.

In particular, due to being able to obtain a cured product with low warping property having high hardness and low corrosiveness by using the active energy ray-curable resin composition of the present invention, it is suitable as the protective coating material for metal or the material of the light transmission layer of an optical recording medium such as a Blu-Ray disk.

PREFERRED MODE FOR CARRYING OUT THE INVENTION

Hereinafter, the present invention will be explained in detail.

Methacrylic Acid Ester Polymer

First, the first to third aspects of the invention will be explained.

The acid value of the methacrylic acid ester polymer of the present invention is no more than 50 mg KOH/g. In the case of the acid value being no more than 50 mg KOH/g, it is possible to reduce the corrosiveness of metal, and for example, in the case of using in the light transmission layer of an optical recording medium, it is possible to reduce the corrosiveness of the reflecting layer. The upper limit for the acid value is not particularly limited; however, it is preferably no more than 30 mg KOH/g, more preferably no more than 10 mg KOH/g, and particularly preferably no more than 1 mg KOH/g.

The transition metal content of the methacrylic acid ester polymer of the present invention is no more than 1 ppm. In the case of the transition metal content being no more than 1 ppm, it is possible to reduce the coloring (yellowing) of the methacrylic acid ester polymer. The upper limit for the transition metal content is more preferably no more than 0.8 ppm, and even more preferably no more than 0.6 ppm.

The methacrylic acid ester polymer of the present invention contains at least 80% by mole of a polymer having a terminal structure expressed by Formula (1) of the total amount of the methacrylic acid ester polymer. In the case of the content of molecules having a terminal structure expressed by Formula (1) being at least 80% by mole, when blended into the active energy ray-curable resin composition, the methacrylic acid ester polymer will further increase in molecular weight while curing, and the strength of the film will improve.

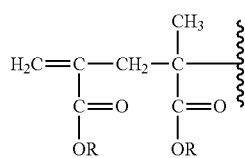
(1)

In Formula (1), R indicates an alkyl group, a cycloalkyl group or an aryl group. In addition, the alkyl group, cycloalkyl group and aryl group may be substituted by a substituent having an epoxy group, hydroxyl group, cyano group, amino group and the like.

As the alkyl group, it is preferably a C1 to C20 linear or branched alkyl group. For Example, a methyl group, ethyl group, n-butyl group, i-butyl group, t-butyl group, 2-ethylhexyl group and lauryl group can be exemplified.

As the cycloalkyl group, it is preferably a C1 to C20 cycloalkyl group. For example, a cyclohexyl group and isobornyl group can be exemplified.

As the aryl group, a C6 to C20 aryl group is preferable. For example, a benzyl group and phenyl group can be exemplified.

In addition, as the substituent of the alkyl group, cycloalkyl group or aryl group represented by R, for example, a glycidyl group, tetrahydrofurfuryl group, hydroxyethyl group and hydroxypropyl group can be exemplified.

Thereamong, it is preferable for R to be a methyl group, ethyl group, i-butyl group, t-butyl group, benzyl group, phenyl group or isobornyl group, and particularly preferably a methyl group.

The mass average molecular weight of the methacrylic acid ester polymer of the present invention is not particularly limited; however, it is preferably 3000 to 30000. In the case of the mass average molecular weight being at least 3000, the hardness and strength of the cured product of the active energy ray-curable resin composition tends to be favorable, and in the case of the mass average molecular weight being no more than 30000, the viscosity of the active energy ray-curable resin composition lowers and the workability tends to be favorable. The upper limit for the mass average molecular weight is particularly preferably no more than 20000.

The yellow index (YI) value of the methacrylic acid ester polymer of the present invention is not particularly limited; however, it is preferably no more than 5. In the case of the YI value being no more than 5, the coloring of a molded article obtained using the methacrylic acid ester polymer or a cured product of the active energy ray-curable resin composition tends to decrease. The upper limit for the YI value is more preferably no more than 4.5, and even more preferably no more than 4.

It should be noted that the YI value is a value arrived at by measuring, at 380 nm to 780 nm, the spectral light transmittance of a solution in which 2.0 g of the methacrylic acid ester polymer has been dissolved in 10 mL of chloroform, and then calculating according to the below formula described in JIS K7105.

Yellow index $(YI)=100(1.28X-1.06Z)/Y$

The methacrylic acid ester polymer of the present invention is a polymer containing at least 50% by mole of methacrylic acid ester monomeric units. The monomers serving as the raw material of the methacrylic acid ester monomeric units are not particularly limited; however, for example, methacrylic acid esters such as methyl methacrylate, ethyl methacrylate, n-butyl methacrylate, i-butyl methacrylate, t-butyl methacrylate, 2-ethylhexyl methacrylate, n-lauryl methacrylate, n-stearyl methacrylate, cyclohexyl methacrylate, phenyl methacrylate, benzyl methacrylate, isobornyl methacrylate, 2-methoxyethyl methacrylate, 2-ethoxyethyl methacrylate and phenoxyethyl methacrylate; hydroxyl group-containing methacrylic acid esters such as 2-hydroxyethyl methacrylate, 2-hydroxypropyl methacrylate, 4-hydroxybutyl methacrylate and glycerol methacrylate; epoxy group-containing methacrylic acid esters such as glycidyl methacrylate, glycidyl α-ethylacrylate and 3,4-epoxybutyl methacrylate; and amino group-containing methacrylic acid esters such as dimethylaminoethyl methacrylate and diethylaminoethyl methacrylate. These can be used by selecting one or more as appropriate.

Among these, methyl methacrylate, ethyl methacrylate, butyl methacrylate, t-butyl methacrylate, phenyl methacrylate, benzyl methacrylate and isobornyl methacrylate are preferable, and methyl methacrylate is particularly preferable.

In addition, in a range less than 50% by mole, another copolymerizable monomer can be used as necessary, such as acrylic acid ester monomers, and vinyl-based monomers like acrylamides, styrene, α-methylstyrene, vinyl toluene, (meth)acrylonitrile, vinyl chloride, vinyl acetate and vinyl propionate.

Production Method of Methacrylic Acid Ester Polymer

Next, the fourth to sixth aspects of the invention will be explained.

The methacrylic acid ester having a polymer with a terminal structure represented by Formula (1) of the present invention, for example, can be produced by the method reported by Cacioli et al. (P. Cacioli, D. G. Hawthorne, E. Rizzardo, R. L. Laslett, D. H. Solomon, J. Macromol Sci. Chem., A23(7), p. 839 (1986)). For example, it may be produced by radical polymerizing methyl methacrylate under the presence of a chain transfer agent (transition metal chelate complex) to synthesize poly MMA macromonomer having vinylidene-type terminal double bonds, or may be directly polymerized without synthesizing macromer.

The production method of the methacrylic acid ester polymer of the present invention is not particularly limited, and a well-known polymerization method such as suspension polymerization, solution polymerization, bulk polymerization and emulsion polymerization can be employed.

Thereamong, the suspension polymerization method is preferable due to being able to efficiently produce the methacrylic acid ester polymer of the present invention.

An example of a production method of the methacrylic acid ester polymer by way of the suspension polymerization method will be shown below. First, the methacrylic acid ester monomer, chain transfer agent and polymerization initiator are added to water containing dispersant to prepare an aqueous suspension, and the aqueous suspension is raised in temperature to cause the polymerization reaction to begin, thereby carrying out suspension polymerization. After polymerization ends, the aqueous suspension is filtered, washed, evaporated and dried to obtain a methacrylic acid ester polymer. The obtained methacrylic acid ester polymer is solid particles.

Dispersant

The dispersant is not particularly limited; however, for example, various dispersants such as poly(meth)acrylate, a poly(meth)acrylate alkali metal salt, an alkali metal salt of a copolymer of (meth)acrylate and methyl (meth)acrylate, polyvinyl alcohol, polyvinyl alcohol of 70 to 100% saponification, and methylcellulose can be employed. The content of dispersant is not particularly limited; however, it is preferably 0.001 to 5% by mass in the aqueous suspension. In the case of the content of dispersant being at least 0.005% by mass, the dispersion stability of the suspension polymerization solution tends to be favorable, and the washability, dewaterability, drying property and flowability of the obtained methacrylic acid ester polymer tend to be favorable. In addition, in the case of the content of dispersant being no more than 5% by mass, there is little foaming during polymerization, and the polymerization stability tends to be favorable. The lower limit for the content of dispersant is more preferably at least 0.005% by mass, and the upper limit for the content of dispersant is more preferably no more than 1% by mass. It should be noted that electrolytes such as sodium carbonate, sodium sulfate and manganese sulfate may be jointly used with the object of a dispersion stability improvement of the aqueous suspension.

Methacrylic Acid Ester Monomer

It should be noted that the aforementioned methacrylic acid ester monomers can be used as the methacrylic acid ester monomer, and the aforementioned other copolymerizable monomers can also be used in the range less than 50% by mole.

Chain Transfer Agent (Transition Metal Chelate Complex)

A transition metal chelate complex is preferably used as the chain transfer agent. The transition metal chelate complex is not particularly limited; however, for example, chelate complexes of transition metals such as Sc (scandium), Ti (titanium), V (vanadium), Cr (chromium), Mn (manganese), Fe (iron), Co (cobalt), Ni (nickel), Cu (copper), Y (yttrium), Zr (zirconium), Nb (niobium), Mo (molybdenum), Tc (technetium), Ru (ruthenium), Rh (rhodium), Pd (palladium), Ag (silver), La (lanthanum), Ce (cerium), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium), Lu (lutetium), Hf (hafnium), Ta (tantalum), W (tungsten), Re (rhenium), Os (osmium), Ir (iridium), Pt (platinum) and Au (gold) can be exemplified. Among these, from the viewpoint of activity as chain transfer agents, a Rh (rhodium) chelate complex, Cr (chromium) chelate complex, Co (cobalt) chelate complex are more preferable, and a Co (cobalt) chelate complex is particularly preferable.

Thereamong, the transition metal chelate complex is preferably a cobalt complex containing cobalt ion and having a nitrogen-containing ligand and/or oxygen-containing ligand as the ligand. As the nitrogen-containing ligand coordinating with cobalt ion, for example, ligands having a nitrogen-containing functional group such as an amide group, amino group, imino group, oximate group, pyridyl group and azo group can be exemplified. Two or more of these functional groups may be included in one type of ligand. As the oxygen-containing ligand coordinating with cobalt ion, for example, ligands having an oxygen-containing functional group such as a hydroxyl group, alkoxy group, carbonyl group, carboxyl group and ester group can be exemplified. Two or more of these functional groups may be included in one type of ligand.

As specific structures of cobalt complexes, for example, the cobalt complexes shown in Formulas (2) to (7) can be exemplified, and in addition thereto, for example, it is possible to use the complexes described in Japanese Patent No. 3587530, Japanese Examined Patent Application, Publication No. H6-23209, Japanese Examined Patent Application, Publication No. H7-35411, U.S. Pat. Nos. 4,526,945, 4,694,054, 4,837,326, 4,886,861, 5,324,879, International Publication No. WO95/17435, and Japanese Unexamined Patent Application (Translation of PCT Publication), Publication No. H9-510499.

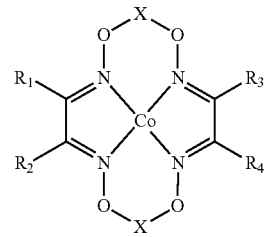

(2)

In Formula (2), $R_1$ to $R_4$ may each be the same or different, and represent a hydrogen atom, a C6 to C12 aryloxy group, a C1 to C12 alkyl group or C6 to C12 aryl group. As the alkyl group, a C1 to C6 alkyl group is more preferable. As the aryl group in the aryloxy group, a phenyl group and naphthyl group are preferable.

X may each be the same or different, X being H, $BF_2$, $BCl_2$, $BBr_2$ or $B(Y)_2$, and herein, Y is a substituent selected from an OH group, C1 to C12 alkoxy group, C6 to C12 aryloxy group, C1 to C12 alkyl group and C6 to C12 aryl group. $BF_2$ or $B(Y)_2$ is preferable as X. As the alkyl group, a C1 to C6 alkyl group is more preferable. As the aryl group and aryl group in the aryloxy group, a phenyl group and naphthyl group are preferable.

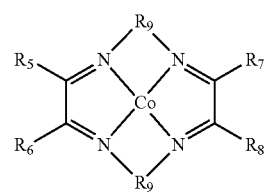

(3)

In Formula (3), $R_5$ to $R_8$ may each be the same or different, and represent a hydrogen atom, C6 to C12 aryloxy group, C1 to C12 alkyl group or C6 to C12 aryl group. As the aryl group and aryl group in the aryloxy group, a phenyl group and naphthyl group are preferable, and as the alkyl group, a C1 to C6 alkyl is preferable.

$R_9$ may each be the same or different, and represents a C1 to C4 alkyl group.

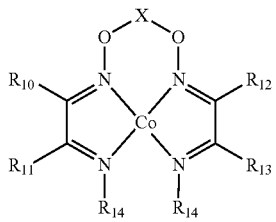

(4)

In Formula (4), $R_{10}$ to $R_{13}$ may each be the same or different, and represent a hydrogen atom, C6 to C12 aryloxy group, C1 to C12 alkyl group or C6 to C12 aryl group. As the alkyl group, a C1 to C6 alkyl group is preferable. As the aryl group and aryl group in the aryloxy group, a phenyl group and naphthyl group are preferable.

$R_{14}$ may each be the same or different, and is a hydrogen atom or C1 to C4 alkyl group.

X is H, $BF_2$, $BCl_2$, $BBr_2$ or $B(Y)_2$, and herein, Y is a substituent selected from an OH group, a C1 to C12 alkoxy group, a C6 to C12 aryloxy group, a C1 to C12 alkyl group and a C6 to C12 aryl group. $BF_2$ or $B(Y)_2$ is preferable as X. As the alkyl group, a C1 to C6 alkyl group is preferable. As the aryl group and aryl group in the aryloxy group, a phenyl group and naphthyl group are preferable.

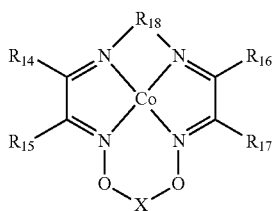

(5)

In Formula (5), $R_{14}$ to $R_{17}$ may each be the same or different, and represent a hydrogen atom, a C6 to C12 aryloxy group, a C1 to C12 alkyl group or a C6 to C12 aryl group. As the aryl group in the aryloxy group, a phenyl group and naphthyl group are preferable. As the alkyl group, a C1 to C6 alkyl group is preferable.

$R_{18}$ represents a C1 to C4 alkyl group.

X is H, $BF_2$, $BCl_2$, $BBr_2$ or $B(Y)_2$, and herein, Y is a substituent selected from an OH group, a C1 to C12 alkoxy group, a C6 to C12 aryloxy group, a C1 to C12 alkyl group and a C6 to C12 aryl group. $BF_2$ or $B(Y)_2$ is preferable as X. As the alkyl group, a C1 to C6 alkyl group is preferable. As the aryl group and aryl group in the aryloxy group, a phenyl group and naphthyl group are preferable.

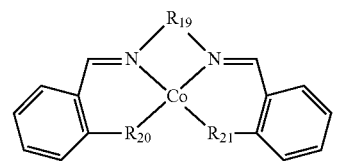

(6)

In Formula (6), $R_{19}$ represents a C1 to C4 alkyl group. $R_{20}$ and $R_{21}$ may each be the same or different, and represent an oxygen atom or NH group.

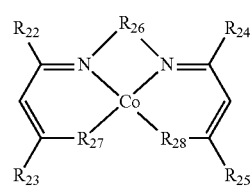

(7)

In Formula (7), $R_{22}$ to $R_{25}$ may each be the same or different, and represent a hydrogen atom, a C6 to C12 aryloxy group, a C1 to C12 alkyl group or a C6 to C12 aryl group. As the aryl group of the aryloxy group or the aryl group, a phenyl group and naphthyl group are preferable. As the alkyl group, a C1 to C6 alkyl group is preferable.

$R_{26}$ represents a C1 to C4 alkyl group.

$R_{27}$ and $R_{28}$ may be the same or different, and represent an oxygen atom or NH group.

It should be noted that, other than the chain transfer agents shown in Formulas (2) to (7), it is possible to use, as the chain transfer agent, a transition metal chelate complex that is well-known as a compound functioning as a chain transfer agent.

The chain transfer agent used in the production method of the present invention is preferably a transition metal chelate complex represented by Formulas (2) to (7) from the viewpoint of obtaining a particularly low-molecular vinyl-based polymer, and thereamong, a transition metal chelate complex represented by Formula (2) is preferable. In particular, it is preferably a transition metal chelate complex in which $R_1$ to $R_4$ in Formula (2) are C6 to C12 aryl groups, and X is $BF_2$ or $B(Y)_2$.

The amount of transition metal chelate complex used is not particularly limited; however, it is preferably 0.0005 to 0.02 parts by mass relative to 100 parts by mass of the methacrylic acid ester monomer. In the case of the amount used thereof being at least 0.0005 parts by mass, a low molecular weight polymer tends to be obtained, and in the case of being no more than 0.02, control of polymerization tends to become easy. For the lower limit of metal chelate complex used, 0.001 parts by mass is more preferable, and 0.005 parts by mass is particularly preferable. In particular, in the case of the amount of metal chelate complex used being at least 0.005 parts by mass, the obtained methacrylic acid ester polymer tends to color to become yellow; however, as stated below, coloring of the methacrylic acid ester polymer tends to be preventable by controlling the pH of the aqueous suspension.

pH of Aqueous Suspension

In the present invention, it is preferable to adjust the pH of the aqueous suspension to 1 to 5, and subsequently initiate polymerization of vinyl-based monomer. In the case of the pH being at least 1, the shape of the obtained solid particles and particle size tend to be uniform. In addition, in the case of the pH being no higher than 5, the methacrylic acid ester polymer tends not to color. The lower limit for pH is more preferably at least 2.

As a pH adjuster for adjusting the pH of the aqueous suspension to 1 to 5, it is preferably a non-radical polymerizable acid free of radical polymerizable functional groups such as carbon-carbon unsaturated bonds in the molecule. In the case of using a non-radical polymerizable acid, the corrosiveness of the obtained methacrylic acid ester polymer tends to be favorable.

The non-radical polymerizable acid is not particularly limited so long as being inert to radical polymerization; however, for example, inorganic acids such as hydrogen chloride, hydrogen bromide, hydrogen iodide, sulfuric acid, phosphoric acid and nitric acid; and organic acids such as formic acid, acetic acid, propanoic acid, hydroxyacetic acid, lactic acid, pyruvic acid, glycolic acid, malonic acid, oxalic acid, benzene-sulfonic acid, toluene-sulfonic acid, methane-sulfonic acid, trifluoroacetic acid, succinic acid, malic acid, tartaric acid, citric acid, salicylic acid, p-aminosalicylic acid, benzoic acid and ascorbic acid can be exemplified.

Among these, acetic acid, propanoic acid and hydroxyacetic acid are preferable, and acetic acid is particularly preferable.

Polymerization Initiator

The polymerization initiator is not particularly limited; however, for example, azo compounds such as 2,2'-azobisisobutyronitrile (AIBN), 2,2'-azobis(2-methylbutyronitrile) and 2,2'-azobis(2,4-dimethylvaleronitrile); organic peroxides such as benzoyl peroxide, lauroyl peroxide, t-butyl peroxy 2-ethylhexanoate, t-hexyl peroxy 2-ethylhexanoate, 1,1,3,3-tetramethylbutyl peroxy 2-ethylhexanoate and t-hexyl hydroperoxide; inorganic peroxides such as hydrogen peroxide, sodium persulfate and ammonium persulfate; etc. can be exemplified.

The amount of polymerization initiator used is not particularly limited; however, it is preferably 0.05 to 10 parts by mass relative to 100 parts by mass of the methacrylic acid ester monomer. In the case of the amount of polymerization initiator used being at least 0.05 parts by mass, the polymerization rate of the methacrylic acid ester monomer increases, and it tends to be possible to produce the methacrylic acid ester polymer in a comparatively short time. In addition, in the case of the amount of polymerization initiator being no more than 10 parts by mass, the generated heat of polymerization is mitigated, and polymerization temperature control tends to be easy. The lower limit for the amount of polymerization initiator used is more preferably at least 0.1 parts by mass, and the upper limit for the amount of polymerization initiator used is more preferably no more than 5 parts by mass.

The polymerization temperature is not particularly limited; however, it is preferably 50 to 130° C. In the case of the polymerization temperature being at least 50° C., it tends to be possible to complete polymerization in a comparatively short time, and the dispersion stability during suspension polymerization tends to be favorable. In addition, in the case of the polymerization temperature being no higher than 130° C., the generated heat of polymerization is mitigated, and polymerization temperature control tends to be easy. The lower limit for the polymerization temperature is more preferably at least 60° C., and particularly preferably at least 70° C. In addition, the upper limit for the polymerization temperature is more preferably no higher than 100° C.

The polymerization time is not particularly limited; however, 0.5 to 10 hours is preferable.

Active Energy Ray-Curable Resin Composition

Next, the seventh and tenth to thirteenth aspects of the invention will be explained.

The active energy ray-curable resin composition of the seventh and tenth to thirteenth aspects of the invention contains a methacrylic acid ester polymer having an acid value of no more than 50 mg KOH/g, and a transition metal content of no more than 1 ppm, the methacrylic acid ester polymer containing at least 80% by mole of a polymer having a terminal double-bond structure expressed by Formula (1) (hereinafter referred to as methacrylic acid ester polymer used in the seventh aspect of the invention).

The content of methacrylic acid ester polymer used in the seventh aspect of the invention is 5 to 50% by mass relative to 100% by mass for the total amount of the content of radical polymerizable compound containing a compound having at least two (meth)acryloyl groups per molecule described later and the content of methacrylic acid ester polymer used in the seventh aspect of the invention.

In the case of this content being at least 5% by mass, the curing shrinkage of the active energy ray-curable resin composition will become small, and thus it tends to be possible to improve the low warping property. In addition, in the case of this content being no more than 50% by mass, the coatability tends to be favorable. The lower limit for this content is more preferably at least 10% by mass. The upper limit for this content is more preferably no more than 45% by mass.

The acid value of the methacrylic acid ester polymer used in the seventh aspect of the invention is no more than 50 mg KOH/g. In the case of the acid value being no more than 50 mg KOH/g, it is possible to lower the metal corrosiveness of the cured product of the active energy ray-curable resin composition. The upper limit for the acid value is preferably no more than 30 mg KOH/g, more preferably no more than 10 mg KOH/g, and particularly preferably no more than 1 mg KOH/g.

The transition metal content of the methacrylic acid ester polymer used in the seventh aspect of the invention is no more than 1 ppm. In the case of the transition metal content being no more than 1 ppm, it is possible to reduce the coloring (yellowing) of the cured product of active energy ray-curable resin composition. The upper limit for the transition metal content is more preferably no more than 0.8 ppm, and even more preferably no more than 0.6 ppm.

The methacrylic acid ester polymer used in the seventh aspect of the invention contains at least 80% by mole of a polymer having the terminal structure expressed by Formula (1) of the total amount of the methacrylic acid ester polymer. In the case of the content of molecules having the terminal structure expressed by Formula (1) being at least 80% by mole, the strength of the cured product of active energy ray-curable resin composition will increase.

The mass average molecular weight of the methacrylic acid ester polymer used in the seventh aspect of the invention is not particularly limited; however, it is preferably 3000 to 30000. In the case of the mass average molecular weight being at least 3000, the hardness and strength of the cured product of active energy ray-curable resin composition tend to be favorable, and in the case of the mass average molecular weight being no more than 30000, the viscosity of the active energy ray-curable resin composition lowers, and the workability tends to be favorable. The upper limit for the mass average molecular weight is more preferably no more than 25000, even more preferably no more than 20000, and particularly preferably no more than 15000.

The YI value of the methacrylic acid ester polymer used in the seventh aspect of the invention is not particularly limited; however, it is preferably no higher than 5. In the case of the YI value being no higher than 5, coloring of the cured product of the active energy ray-curable resin composition tends to decrease. The upper limit for the YI value is more preferably no higher than 4.5, even more preferably no higher than 4, and particularly preferably no higher than 3.5.

The glass transition temperature of the methacrylic acid ester polymer used in the seventh aspect of the invention is not particularly limited; however, from the viewpoint of the high-temperature and high-humidity resistance of the cured product of active energy ray-curable resin composition, it is preferably at least 50° C. The lower limit for the glass transition temperature is more preferably at least 55° C.

The methacrylic acid ester polymer used in the seventh aspect of the invention is a polymer containing at least 50% by mole of methacrylic acid ester monomeric units. The monomers serving as the raw material of the methacrylic acid ester monomeric units are not particularly limited; however, for example, methacrylic acid esters such as methyl methacrylate, ethyl methacrylate, n-butyl methacrylate, i-butyl methacrylate, t-butyl methacrylate, 2-ethylhexyl methacrylate, n-lauryl methacrylate, n-stearyl methacrylate, cyclohexyl methacrylate, phenyl methacrylate, benzyl methacrylate, isobornyl methacrylate, 2-methoxyethyl methacrylate, 2-ethoxyethyl methacrylate and phenoxyethyl methacrylate; hydroxyl group-containing methacrylic acid esters such as 2-hydroxyethyl methacrylate, 2-hydroxypropyl methacrylate, 4-hydroxybutyl methacrylate and glycerol methacrylate; epoxy group-containing methacrylic acid esters such as glycidyl methacrylate, glycidyl α-ethylacrylate and 3,4-epoxybutyl methacrylate; and amino group-containing methacrylic acid esters such as dimethylaminoethyl methacrylate and diethylaminoethyl methacrylate. These can be used by selecting one or more as appropriate.

In addition, in a range less than 50% by mole, monomeric units may be contained with another copolymerizable monomer as a raw material such as acrylic acid ester monomers, and vinyl-based monomers like acrylamides, styrene, α-methylstyrene, vinyl toluene, (meth)acrylonitrile, vinyl chloride, vinyl acetate and vinyl propionate.

The active energy ray-curable resin composition of the seventh and tenth to thirteenth aspects of the invention contains a radical polymerizable compound including a compound having at least two (meth)acryloyl groups per molecule. It should be noted that radical polymerizable compound is a compound for which the polymerization reaction is caused by radicals.

The content of radical polymerizable compound including a compound having at least two (meth)acryloyl groups per molecule is 50 to 95% by mass, relative to 100% by mass for the total amount of the content of methacrylic acid ester polymer used in the seventh aspect of the invention and the content of radical polymerizable compound including a compound having at least two (meth)acryloyl groups per molecule.

In the case of this content being at least 50% by mass, the coatability tends to be favorable. In the case of this content being no more than 95% by mass, the curing shrinkage of the active energy ray-curable resin composition will become small, and it is possible to improve the low warping property. The lower limit for this content is more preferably at least 55% by mass. The upper limit for this content is more preferably no more than 90% by mass.

The compound having at least two (meth)acryloyl groups per molecule is a component that causes the cured product of active energy ray-curable resin composition to crosslink, and thus is a component that raises the hardness of the cured product. In addition, it is a component that suppresses appearance defects such as wrinkles in the cured product.

In the compound having at least two (meth)acryloyl groups per molecule, the number of (meth)acryloyl groups per molecule is preferably no more than 6, and more preferably no more than 3, from the viewpoint of the low warping property.

The compound having at least two (meth)acryloyl groups per molecule is not particularly limited; however, hydroxypivalic acid neopentylglycol di(meth)acrylate, tetraethyleneglycol di(meth)acrylate, tripropyleneglycol di(meth)acrylate, polyethyleneglycol di(meth)acrylate, polypropyleneglycol di(meth)acrylate, polybutyleneglycol di(meth)acrylate, tricyclodecane dimethanol di(meth)acrylate, bis(2-acryloyloxyethyl)-2-hydroxyethyl isocyanurate, ethyleneoxide-modified bisphenol A di(meth)acrylate, propyleneoxide-modified bisphenol A di(meth)acrylate, 1,6-hexanediol di(meth)acrylate, trimethylolpropane tri(meth)acrylate, neopentylglycol-modified trimethylolpropane di(meth)acrylate, ethyleneoxide-modified trimethylolpropane tri(meth)acrylate, propyleneoxide-modified trimethylolpropane tri(meth)acrylate, di-trimethylolproprane tetra(meth)acrylate, pentaerythritol tri(meth)acrylate, pentaerythritol tetra(meth)acrylate, ethoxylated pentaerythritol tri(meth)acrylate, ethoxylated pentaerythritol tetra(meth)acrylate, tris(2-acryloyloxyethyl)isocyanurate, di-pentaerythriol penta(meth)acrylate, di-pentaerythritol hexa(meth)acrylate, caprolactone-modified dipentaerythritol penta(meth)acrylate and caprolactone-modified dipentaerythritol hexa(meth)acrylate can be exemplified. For these, one type can be employed independently, or two or more types can be jointly used.

Among these, it is preferable to include a compound having 2 or 3 (meth)acryloyl groups per molecule, and from the viewpoint of the balance between hardness and low warping property, bisphenol A di(meth)acrylate modified by 4 to 6 alkylene oxides per molecule, tricyclodecane dimethanol di(meth)acrylate, neopentylglycol-modified trimethylolpropane di(meth)acrylate, and trimethylolpropane tri (meth)acrylate modified by 3 to 6 alkylene oxides per molecule are preferable; and bisphenol A di(meth)acrylate modified by 4 to 6 ethylene oxides per molecule, bisphenol A di(meth)acrylate modified by 4 to 6 propylene oxides per molecule, tricyclodecane dimethanol di(meth)acrylate, neopentylglycol-modified trimethylolpropane di(meth)acrylate, trimethylolpropane tri(meth)acrylate modified by 3 to 6 ethyleneoxides per molecule, and trimethylolpropane tri (meth)acrylate modified by 3 to 6 propylene oxides per molecule are particularly preferable.

The content of compound having at least two (meth) acryloyl groups per molecule is preferably within the range of 20 to 90% by mass, relative to 100% by mass for the total amount of the content of radical polymerizable compound including the compound having at least two (meth)acryloyl groups per molecule and the content of the methacrylic acid ester polymer used in the seventh aspect of the invention. In the case of this content being at least 20% by mass, the hardness of the cured product and the appearance (smoothness) of the cured product tend to be favorable, and in the case of this content being no more than 90% by mass, the low warping property of the cured product tends to be more favorable. The lower limit for this content is more preferably at least 25% by mass, and the upper limit for this content is more preferably no more than 70% by mass.

The radical polymerizable compound contains a compound having at least two (meth)acryloyl groups per molecule as an essential component; however, it may further include a compound having one (meth)acryloyl group per molecule as necessary.

In particular, from the aspect of the coating property of the active energy ray-curable resin composition, it is preferable to contain a compound having one (meth)acryloyl group per molecule in the radical polymerizable compound as a dilution component. The compound having one (meth)acryloyl group per molecule is not particularly limited; however, tetrahydrofurfuryl (meth)acrylate, 2-ethyl-hexyl (meth)acrylate, 2-ethyl-2-methyl-1,3-dioxolane-4-yl-methyl (meth)acrylate, isobornyl (meth)acrylate, dicyclopentenyl (meth)acrylate, dicyclopentanyl (meth)acrylate, ethyleneoxide-modified phosphoric acid (meth)acrylate, caprolactone-modified phosphoric acid (meth)acrylate, phenoxyethyl (meth)acrylate, phenyl diethyleneglycol (meth)acrylate, nonylphenyloxyethyl (meth)acrylate, dicyclopentanyloxyethyl (meth)acrylate, dicylcopentenyloxyethyl (meth)acrylate, etc. can be exemplified.

Among these, from the viewpoint of dilutability, tetrahydrofurfuryl (meth)acrylate, phenoxyethyl (meth)acrylate and 2-ethyl-2-methyl-1,3-dioxolane-4-yl-methyl (meth)acrylate are preferable.

In the case of the radical polymerizable compound including a compound having at least two (meth)acryloyl groups per molecule containing a compound having one (meth)acryloyl group per molecule, the content of the compound having one (meth)acryloyl group per molecule is preferably within the range of 10 to 50% by mass relative to 100% by mass for the total amount of the content of the radical polymerizable compound and the content of the methacrylic acid ester polymer used in the seventh aspect of the invention. In the case of this content being at least 10% by mass, the low warping property of the cured product tends to be more favorable, and in the case of this content being no more than 50% by mass, the hardness of the cured product and the appearance (smoothness) of the cured product tend to be favorable. The lower limit for this content is more preferably at least 20% by mass, and the upper limit for this content is more preferably no more than 40% by mass.

The active energy ray-curable resin composition of the seventh and tenth to thirteenth aspects of the invention contains a photopolymerization initiator. The photopolymerization initiator is a component for causing the active energy ray-curable resin composition to efficiently cure by way of active energy exposure.

The content of the photopolymerization initiator is 1 to 20 parts by mass, relative to 100 parts by mass for the total amount of the content of the methacrylic acid ester polymer used in the seventh aspect of the invention and the content of the radical polymerizable compound including a compound having at least two (meth)acryloyl groups per molecule, from the viewpoint of curability of the active energy ray-curable resin composition in an air atmosphere. In the case of this content being at least 1 part by mass, the curability of the active energy ray-curable resin composition will be favorable. In addition, in the case of this content being no more than 20 parts by mass, the cured product of the active energy ray-curable resin composition will not easily turn yellow. The lower limit for this content is more preferably at least 3 parts by mass, and the upper limit is more preferably no more than 10 parts by mass.

The photopolymerization initiator is not particularly limited; however, benzophenone, 4-methylbenzophenone, 2,4,6-trimethylbenzophenone, methyl ortho benzoylbenzoate, 4-phenylbenzophenone, t-butylanthraquinone, 2-ethylanthraquinone, 2-hydroxy-2-methyl-1-phenylpropane-1-one, oligo{2-hydroxy-2-methyl-1-(4-(1-methylvinyl)phenyl) propanone}, benzyldimethyl ketal, 1-hydroxycyclohexyl-phenyl ketone, benzoin methyl ether, benzoin ethyl ether, benzoin isopropyl ether, benzoin isobutyl ether, 2-methyl-(4-(methylthio)phenyl)-2-morpholino-1-propanone, 2-benzyl-2-dimethylamino-1-(4-morpholinophenyl)-butanone-1, diethyl thioxanthone, isopropyl thioxanthone, 2,4,6-trimethylbenzoyl diphenylphosphene oxide, bis(2,6-dimethoxybenzoyl)-2,4,4-trimethylpentylphosphene oxide, bis(2,4,6-trimethylbenzoyl)-phenylphosphene oxide, 2-hydroxy-1-{4-(4-(2-hydroxy-2-methylpropionyl)benzyl)phenyl}-2-methylpropane-1-one and methyl benzoylformate can be exemplified.

Among these, from the viewpoint of curability of the resin composition and yellowing resistance of the cured product, 2-hydroxy-2-methyl-1-phenylpropane-1-one and 1-hydroxycyclohexyl-phenyl ketone are preferable.

The active energy ray-curable resin composition of the seventh and tenth to thirteenth aspects of the invention may contain other components, for example, known additives such as antifouling agents, slip agents, adhesion-imparting agents, thermal polymerization initiators, antioxidants or photostabilizers, photosensitizers, thermoplastic resins, leveling agents, ultraviolet absorbers, polymerization inhibitors, inorganic fillers, organic fillers and organically surface-treated inorganic fillers, in a range in which the effects of the present invention are not impaired.

In addition, the active energy ray-curable resin composition of the seventh and tenth to thirteenth aspects of the invention may include an organic solvent, or may be a solvent-free type of active energy ray-curable resin composition not containing organic solvent. In the case of the active energy ray-curable resin composition of the seventh and tenth to thirteenth aspects of the invention including organic solvent, the content of the organic solvent is preferably no more than 1% by mass of the total amount of the active energy ray-curable resin composition of the seventh and tenth to thirteenth aspects of the invention. In the case of the content of organic solvent being no more than 1% by mass, the productivity of the cured product of the active energy ray-curable resin composition tends to be favorable. The content of organic solvent is more preferably no more than 0.5% by mass, even more preferably no more than 0.1% by mass, and particularly preferably organic solvents are not substantially contained.

Next, the eighth to thirteenth aspects of the invention will be explained.

The active energy ray-curable resin composition of the eighth to thirteenth aspects of the invention contains methacrylic acid ester polymer that is a methacrylic acid ester polymer having an acid value of no higher than 50 mg KOH/g, and a mass average molecular weight of 3000 to 30000 (hereinafter referred to as methacrylic acid ester polymer used in the eighth aspect of the invention).

The content of the methacrylic acid ester polymer used in the eighth aspect of the invention is 5 to 50% by mass relative to 100% by mass for the total amount of the content of radical polymerizable compound including the aforementioned compound having at least two (meth)acryloyl groups per molecule and the content of the methacrylic acid ester polymer used in the eighth aspect of the invention.

In the case of this content being at least 5% by mass, the curing shrinkage of the active energy ray-curable resin composition becomes small, and it tends to be possible to improve the low warping property. In addition, in the case of this content being no more than 50% by mass, the coatability tends to be favorable. The lower limit for this content is more preferably at least 10% by mass, and the upper limit for this content is more preferably no more than 45% by mass.

The acid value of the methacrylic acid ester polymer used in the eighth aspect of the invention is no higher than 50 mg KOH/g. In the case of the acid value being no higher than 50 mg KOH/g, it is possible to lower the metal corrosiveness of the cured product of active energy ray-curable resin composition. The upper limit for the acid value is preferably no higher than 30 mg KOH/g, more preferably no higher than 10 mg KOH/g, and particularly preferably no higher than 1 mg KOH/g.

The mass average molecular weight of the methacrylic acid ester polymer used in the eighth aspect of the invention is 3000 to 30000. In the case of the mass average molecular weight being at least 3000, the hardness and strength of the cured product of the active energy ray-curable resin composition will be favorable, and in the case of the mass average molecular weight being no more than 30000, the viscosity of the active energy ray-curable resin composition will become low, and thus workability will be favorable. The upper limit for the mass average molecular weight is preferably no higher than 25000, more preferably no higher than 20000, and particularly preferably no higher than 15000.

The methacrylic acid ester polymer used in the eighth aspect of the invention preferably contains at least 80% by mole of a polymer having a terminal structure expressed by the aforementioned Formula (1) of the total amount of the methacrylic acid ester polymer. In the case of the content of molecules having a terminal structure expressed by Formula (1) being at least 80% by mole, the strength of the cured product of active energy ray-curable resin composition tends to improve.

The glass transition temperature of the methacrylic acid ester polymer used in the eighth aspect of the invention is not particularly limited; however, from the viewpoint of the high-temperature and high-humidity resistance of the cured product of active energy ray-curable resin composition, it is preferably at least 50° C. The lower limit for the glass transition temperature is more preferably at least 55° C.

The transition metal content of the methacrylic acid ester polymer used in the eighth aspect of the invention is not particularly limited; however, it is preferably no more than 1 ppm. In the case of the transition metal content being no more than 1 ppm, it tends to be possible to reduce the coloring (yellowing) of the cured product of active energy ray-curable resin composition. The upper limit for the transition metal content is preferably no more than 0.8 ppm, and particularly preferably no more than 0.6 ppm.

The YI value of the methacrylic acid ester polymer used in the eighth aspect of the invention is not particularly limited; however, it is preferably no more than 5. In the case of the YI value being no more than 5, coloring of the cured product of active energy ray-curable resin composition tends to decrease. The upper limit for the YI value is preferably no more than 4.5, even more preferably no more than 4, and particularly preferably no more than 3.5.

The methacrylic acid ester polymer used in the eighth aspect of the invention is a polymer containing at least 50% by mole of methacrylic acid ester monomeric units. The monomers serving as the raw material of the methacrylic acid ester monomeric units are not particularly limited; however, the methacrylic acid ester monomers exemplified by the methacrylic acid ester polymer used in the seventh aspect of the invention can be exemplified thereas.

In addition, in a range less than 50% by mole, the methacrylic acid ester polymer used in the eighth aspect of the invention may contain monomeric units with another copolymerizable monomer as a raw material such as acrylic acid ester monomers, and vinyl-based monomers like acrylamides, styrene, α-methylstyrene, vinyl toluene, (meth)acrylonitrile, vinyl chloride, vinyl acetate and vinyl propionate.

The methacrylic acid ester polymer used in the eighth to thirteenth aspects of the invention contains a radical polymerizable compound including a compound having at least two (meth)acryloyl groups per molecule.

It should be noted that the radical polymerizable compound used in the active energy ray-curable resin composition of the eighth to thirteenth aspects of the invention can use the same radical polymerizable compound used in the aforementioned active energy ray-curable resin composition of the seventh and tenth to thirteenth aspects, and the preferred compounds are also the same.

In addition, the content and preferred content of the radical polymerizable compound used in the active energy ray-curable resin composition of the eighth to thirteenth aspects of the invention are the same as the content of radical polymerizable compound used in the aforementioned active energy ray-curable resin composition of the seventh and tenth to thirteenth aspects, and the content may be considered by substituting and reading "methacrylic acid ester polymer used in the seventh aspect of the invention" with "methacrylic acid ester polymer used in the eighth aspect of the invention".

The active energy ray-curable resin composition of the eighth to thirteenth aspects of the invention contains a photopolymerization initiator. The photopolymerization initiator used in the active energy ray-curable resin composition of the eighth to thirteenth aspects of the invention can employ the same one as the photopolymerization initiator used in the aforementioned active energy ray-curable resin composition of the seventh and tenth to thirteenth aspects of the invention, and the preferred compounds are also the same.

In addition, the content and preferred content of photopolymerization initiator used in the active energy ray-curable resin composition of the eighth to thirteenth aspects of the invention are the same as the content of photopolymerization initiator used in the aforementioned active energy ray-curable resin composition of the seventh and tenth to thirteenth aspects of the invention, and the content may be considered by substituting and reading "methacrylic acid ester polymer used in the seventh aspect of the invention" with "methacrylic acid ester polymer used in the eighth aspect of the invention".

In the active energy ray-curable resin composition of the eighth to thirteenth aspects of the invention, the content of organic solvent is no more than 1% by mass. In the case of the content of organic solvent being no more than 1% by mass, the productivity of the cured product of active energy ray-curable resin composition will be favorable. The content of organic solvent is preferably no more than 0.5% by mass, more preferably no more than 0.1% by mass, and particularly preferably organic solvents are not substantially contained.

The active energy ray-curable resin composition of the eighth to thirteenth aspects of the invention may contain other components, for example, known additives such as antifouling agents, slip agents, adhesion-imparting agents, thermal polymerization initiators, antioxidants or photostabilizers, photosensitizers, thermoplastic resins, leveling agents, ultraviolet absorbers, polymerization inhibitors, inorganic fillers, organic fillers and organically surface-treated inorganic fillers, in a range in which the effects of the present invention are not impaired.

The content of other components is not particularly limited; however, it is preferably no more than 10% by mass, and more preferably no more than 5% by mass.

Article Having Layer Consisting of Cured Product of Active Energy Ray-Curable Resin Composition on Metal Next, the fourteenth aspect of the invention will be explained. The fourteenth aspect of the invention is an article having a layer consisting of a cured product of the active energy ray-curable resin composition of the seventh to thirteenth aspects on metal.

The active energy ray-curable resin composition of the seventh to thirteenth aspects can be applied to metal, glass, ceramics, fabric, wood, plastics, etc.; however, it is a material particularly suited to the case of applying onto metal.

It should be noted that gold, silver, copper, iron, palladium, indium, tellurium, tin, zinc, yttrium, cerium, aluminum, titanium, cobalt, alloys of these, etc. can be exemplified as the metal. The active energy ray-curable resin composition coated on metal can be cured by exposing to active energy rays.

As the active energy rays, for example, α-rays, β-rays, γ-rays, X-rays, ultraviolet rays and visible light rays can be exemplified. From the viewpoints of workability and curability, ultraviolet rays are particularly preferable. As the light source exposing ultraviolet rays, a high-voltage mercury light, metal-halide lamp, xenon flash tube, LED lamp, etc. can be exemplified. From the viewpoints of curability of the active energy ray-curable resin composition and abrasion resistance of the cured product, a high-voltage mercury light and metal-halide lamp are particularly preferable.

The active energy ray-curable resin composition is preferably coated with a known coating method such as a spin coating method, spray coating method and brush coating method. The thickness of the obtained film is preferably set so as to be a thickness of 10 to 300 μm after curing. In addition, it is more preferably set to a thickness of 50 to 150 μm.

Optical Recording Medium Having Layer Consisting of Cured Product of Active Energy Ray-Curable Resin Composition Finally, the fifteenth aspect of the invention will be explained.

The fifteenth aspect of the invention is an optical recording medium having a layer consisting of a cured product of the active energy ray-curable resin composition of the seventh to thirteenth aspects of the invention.

The active energy ray-curable resin composition of the seventh to thirteenth aspects of the invention is ideally used in the production of various articles, and particularly is ideally used in the production of optical recording media, due to warping of the cured product thereof being small and hardness being high. In optical recording media, it can be utilized as a light transmission layer or a protective layer. A Blu-Ray disk or the like can be exemplified as the optical recording medium.

The optical recording medium can possess a structure having an information recording face on a support substrate, and having a light transmission layer on this information recording face. In addition, the recording light or playback light is incident through this light transmission layer, whereby information can be recorded on the information recording face, and the information of the information recording face can be read.

As the support substrate of the light recording medium, for example, metal, glass, ceramics, plastics and composite materials of these can be exemplified. In particular, in the aspect of being able to use a conventional optical disk production process, thermoplastic resins such as methyl methacrylate-based resins, polyesters, polylactides, polycarbonates and amorphous polyolefins are suitable.

On at least one side of the information recording face, a dielectric layer of SiN, ZnS, $SiO_2$ or the like can be provided with the object of protection of the information recording face or the optical effect of causing the reflectance of laser light to change.

The light transmission layer is a cured product of the aforementioned active energy ray-curable resin composition, and the thickness thereof is preferably 0.5 to 300 μm. The thickness of the light transmission layer is preferably 1 to 200 μm, and more preferably 1.5 to 150 μm. In addition, it is preferable to have a transparency to laser light with a wavelength on the order of 400 nm for recording on the information recording face and playback. If air bubbles are present in the light transmission layer, due to being a cause of reading or writing errors, it is preferable to degas the active energy ray-curable resin composition under vacuum, ultrasonic vibration or centrifuge conditions, or under a combination of these conditions, in advance.

From the viewpoint of workability, the active energy ray-curable resin composition is preferably coated, by a known coating method such as a spin coating method, spray coating method and brush coating method, onto an independent support substrate or one on which an information recording face of an inorganic substance such as a metal or an organic substance such as an organic dye has been formed on the support substrate. The thickness of the obtained film is preferably set so as to be a thickness of 10 to 300 μm after curing. In addition, it is more preferably set to be a thickness of 50 to 150 μm.

It should be noted that, in the case of using the active energy ray-curable resin composition for the light transmission layer of an optical recording medium, in order to prevent reading and writing errors due to the presence of foreign contamination such as dust or gels, it is preferably filtered in advance using a filter that can remove foreign contamination of 5 μm and larger, and preferably of 1 μm and larger.

As the material of the filter, for example, cellulose, polyethylene, polypropylene, polytetrafluoroethylene and nylon can be exemplified.

The film obtained above is cured by active energy rays, whereby a light transmission layer consisting of the active energy ray-curable resin composition is formed on the information recording face to obtain an optical recording medium.

As the environment for exposing active energy rays onto the above-mentioned film, although any of air or an inert gas such as nitrogen and argon is acceptable, in air is preferable in the aspect of production cost.

By using the active energy ray-curable resin composition of the present invention, an optical recording medium having a light transmission layer that excels in hardness and low warping property is obtained.

EXAMPLES

Hereinafter, the present invention will be specifically explained by way of the Examples; however, the present invention is not to be limited thereto. It should be noted that "parts" hereinafter represents "parts by mass". In addition, measurement and evaluation of the respective properties were carried out by the following methods.

Terminal Structure of Methacrylic Acid Ester Polymer

The methacrylic acid ester polymer was made to dissolve in chloroform, and 1H-NMR measurement was carried out using a nuclear magnetic resonator UNITY INOVA 500 superconducting FT-NMR (Trademark) manufactured by Varian. Peaks originating from the terminal double bonds were confirmed at 5.5 and 6.2 ppm, thereby identifying the terminal structure.

The number average absolute molecular weight was measured by way of GPC-LALLS measurement using an HLC-8220GPC manufactured by Tosoh Corp. and a TriSEC302TDA manufactured by Viscotek. The number average degree of polymerization was obtained by dividing this number average absolute molecular weight by the average molecular weight of the monomer obtained by weight averaging the mole ratios of the monomers used. On the other hand, the ratio of terminal double-bonds relative to monomeric units (mol %) was obtained from superconducting FT-NMR, and the terminal double-bond amount (mol %) was calculated by way of the formula below.

Terminal double-bond amount (mol %)=number average degree of polymerization×ratio of terminal double-bonds Acid Value of Methacrylic Acid Ester Polymer The methacrylic acid ester polymer was dissolved in toluene, and measured with an ethanolic KOH solution using an automatic titrator COMTITE-550 (manufactured by Hiranuma Co., Ltd.).

Transition Metal Content of Methacrylic Acid Ester Polymer

The transition metal content was measured using an ICP emission analyzer IRIS-AP (trade name) manufactured by Thermo Fisher Scientific K.K.

Mass Average Molecular Weight of Methacrylic Acid Ester Polymer

The mass average molecular weight of the methacrylic acid ester polymer was obtained by the gel permeation chromatography (GPC) method. It should be noted that a calibration curve was prepared using standard polystyrene, and the number average molecular weight (Mn), mass average molecular weight (Mw) and dispersity (Mw/Mn) were obtained by polystyrene conversion.

Apparatus used: HLC-8320 (trade name) manufactured by Tosoh Corp.

Columns: TSKgel SUPER H-4000 (6.0 mmφ×150 mm) (trade name) and TSKgel SUPER H-2000 (6.0 mmφ×150 mm) trade name) manufactured by Tosoh Corp. were used by putting two in series.

Solvent: tetrahydrofuran (THF)

Measurement temperature: 40° C.

Sample: THF solution of methacrylic acid ester polymer (concentration: 0.2% by mass)

Standard polystyrene: ones used of below molecular weights manufactured by Tosoh Corp. 6200000, 2800000, 1110000, 707000, 354000, 189000, 98900, 37200, 9830, 5870, 500, 340

Glass Transition Temperature of Methacrylic Acid Ester Polymer

Using a high sensitivity differential scanning calorimeter Thermoplus EVOII/DSC8230 (trade name) manufactured by Rigaku, about 10 mg of sample was heated from room temperature to 120° C. at a heating rate of 20° C./min to obtain a DSC curve, with α-alumina as the reference under a nitrogen gas environment, based on JIS-K-7121. The temperature at the intersection between a straight line made by extending the base line on the low temperature side of this DSC curve to the high temperature side, and a tangent line drawn at a point such that a curve gradient of a step-like portion of the glass transition becomes a maximum (extrapolated starting temperature of glass transition) was defined as the glass transition temperature.

pH of Aqueous Suspension

The pH of the aqueous suspension was measured using a Kasutani LAB pH Meter F-21II manufactured by Horiba, Ltd.

Degree of Coloring of Methacrylic Acid Ester Polymer

Spectral liquid transmittance at 380 nm to 780 nm of a solution prepared by dissolving about 2.0 g of methacrylic acid ester polymer in 10 mL of chloroform was measured using a U-3300 (trade name) manufactured by Hitachi High-Tech Fielding Corp., and the yellow index (YI) was calculated. Based on the tristimulus values X, Y and Z, it was calculated according to the formula below described in JIS K7105. It should be noted that the matter of the yellowness (yellowing, degree of coloring) increasing is represented higher numerical values of YI.

Yellow index $(YI)=100(1.28X-1.06Z)/Y$

Low Warping Property of Optical Recording Model Medium

Using an IOPC blu Tilt-scanner (trade name) manufactured by Dr. Schwab Inspection Technology GmbH, the warp angle of an optical recording model medium was measured under a 23° C., 50% relative humidity environment. It should be noted that warp angle indicates a radial tilt of the optical recording medium at a position 48 mm from the center. The judgment criteria of low warping property were as follows.

Hardness of Cured Product Layer of Optical Recording Model Medium

Using a Fischerscope HM2000 (trade name) manufactured by Fischerscope, the Martens hardness of the cured product layer of the optical recording model medium was measured in accordance with ISO14577. It should be noted that, as the indenter, one of four-sided pyramid-type with an opposing face angle of 135° made of diamond was used. More specifically, the indenter was increased in load up to 50 mN for 10 seconds to the cured product so that $dF/dt_2$ (F=load, t=elapsed time) became constant, then was made to creep for 5 seconds, and subsequently, with the same conditions as when increasing load, was unloaded.

High-Temperature and High-Humidity Resistance of Optical Recording Model Medium (Corrosion Resistance)

After leaving the optical recording model medium to stand for 100 hours under a 80° C., 85% relative humidity environment, the appearance of the silver alloy reflective film and cured product of active energy ray-curable resin composition were confirmed visually. The judgment criteria for high-temperature and high-humidity resistance were as follows.

○: no corrosion seen on silver alloy reflective film

×: corrosion seen on silver alloy reflective film

Production Example 1

Production of Dispersant 1

To a polymerizer equipped with a mixer, cooling pipe and thermometer, 900 parts of deionized water, 60 parts of sodium 2-sulfoethyl methacrylate, 10 parts of potassium methacrylate and 12 parts of methyl methacrylate were placed and mixed, then heated to 50° C. while nitrogen substituting inside of the polymerizer. Thereinto, 0.08 parts of 2,2'-azobis(2-methylpropionamidine) dihydrochloride was added, and further heated to 60° C. After heating, methyl methacrylate was added drop-wise continuously for 75 minutes at a rate of 0.24 parts/min using a drip pump. After maintaining the reaction solution at 60° C. for 6 hours, it was cooled to room temperature to obtain Dispersant 1 of 10% by mass solid content, which was a transparent aqueous solution.

Production Example 2

Production of Chain Transfer Agent 1 (Transition Metal Chelate Complex)

Into a synthesizer equipped with a mixing device, 2.00 g (8.03 mmol) of cobalt(II) acetate tetrahydrate ($Co(OC(=O)CH_3)_2 \cdot 4H_2O$), 3.86 g (16.1 mmol) of diphenylglyoxime, and 100 ml of diethyl ether that had been deoxidized by bubbling nitrogen in advance were placed under a nitrogen environment, and mixed at room temperature for 2 hours. Next, 20 ml of boron trifluoride-diethyl ether complex was added, and further mixed for 6 hours. The mixture was filtered, the solid was washed with diethyl ether, dried for about 12 hours at 20° C. with vacuum conditions of no more than 100 Mpa to obtain the Chain Transfer Agent 1, which was a dark reddish-brown solid (compound of Formula (1) in which $R_1$ to $R_4$ are phenyl groups, and X is expressed by $BF_2$) at a yield of 5.02 g (7.93 mmol, 99% yield).

Production Example 3

Production of Urethane Acrylate (UA)

To a three-necked flask with a volume of 5 liters equipped with a mixer, temperature regulator, thermometer and condenser, 1112 g (10 mole equivalents) of isophorone diisocyanate (Desmodur I (trade name), manufactured by Sumitomo Bayer Urethane: 60 ppm hydrolyzable chlorides amount) and 0.5 g of dibutyltin dilaurate were charged, and heated in a water bath so that the internal temperature reached 70° C.

Next, a liquid produced by uniformly mixing and dissolving 193 g (2.4 mole equivalents) of N-methyl-N-(2-hydroxyethyl)-3-hydroxypropylamide and 1105 g (2.6 mole equivalents) of polybutylene glycol (n=12; number average molecular weight: 850) was charged to a drop funnel with a side tube, and the contents of this drop funnel were dropped while mixing the contents in the flask. It should be noted that, while keeping the flask inside temperature at 65 to 75° C., the contents of the drop funnel were added drop-wise at a constant rate over 4 hours, and after drop-wise addition completion, was mixed and allowed to react at the same temperature for 2 hours. Next, after lowering the temperature of the flask contents to 60° C., a liquid produced by uniformly mixing and dissolving 581 g (5 mole equivalents) of 2-hydroxyethyl acrylate and 1.5 g of hydroquinone monomethyl ether was added drop-wise at a constant rate over 2 hours using another dropping funnel, while keeping the flask inside temperature at 55 to 65° C. After drop-wise addition completion, the temperature of the flask contents was raised to allow reaction at 75 to 85° C. for 4 hours to produce bi-functional urethane acrylate (hereinafter referred to as "UA").

Example 1

Into a polymerizer equipped with a mixer, cooling tube and thermometer, 200 parts of deionized water, 0.13 parts of sodium sulfate ($Na_2SO_4$) and 0.26 parts of Dispersant 1 (10% by mass solid content) produced in Production Example 1 were placed and mixed to make a uniform aqueous solution. To this aqueous solution, acetic acid ($CH_3COOH$) was added drop-wise as a pH adjuster so as to make pH=2.4.

Next, 100 parts of methyl methacrylate, 0.0065 parts of the Chain Transfer Agent 1 produced in Production Example 2 and 0.7 parts of 2,2'-azobisisobutyronitrile (AIBN) were added to make an aqueous suspension. Upon measuring the pH of the aqueous suspension, it was 2.4.

Next, the inside of the polymerizer was sufficiently nitrogen substituted, heated to 80° C. and reacted for about 2 hours, and in order to further raise the rate of polymerization, heated to 92° C. as a post-treatment temperature and maintained for 30 minutes. Subsequently, the reaction liquid was cooled to 40° C., to obtain an aqueous suspension containing methacrylic acid ester polymer.

This aqueous suspension was filtered with a nylon filter cloth of 45 μm sieve opening, the filtered material was washed with deionized water, and dried at 40° C. for 16 hours to obtain methacrylic acid ester polymer (AP-1).

The acid value of methacrylic acid ester polymer (AP-1) was 0.5 mg KOH/g, the polystyrene conversion molecular weights calculated by gel permeation chromatography were Mn=3,700 and Mw=11,000, the glass transition temperature was 93° C., and YI was 2.7.

Examples 2 to 4

Except for changing the pH of the aqueous suspension as shown in Table 1, methacrylic acid ester polymers (AP-2) to (AP-4) were produced by the same method as Example 1. The evaluation results of the obtained methacrylic acid ester polymers are shown in Table 1.

Comparative Example 1

Except for not adding acetic acid drop-wise as a pH adjuster, methacrylic acid ester polymer (AP-5) was produced by the same method as Example 1. The evaluation results of the obtained methacrylic acid ester polymer are shown in Table 1.

TABLE 1

|  | Example 1 | Example 2 | Example 3 | Example 4 | Comparative Example 1 | Comparative Example 3 |
|---|---|---|---|---|---|---|
| pH of aqueous suspension | 2.4 | 3.2 | 4.1 | 4.9 | 7.3 | 2.9 |
| Acid value(mgKOH/g) | 0.5 | 0.4 | 0.4 | 0.3 | 0.3 | 52.1 |
| Transition metal content(ppm) | 0.44 | 0.43 | 0.65 | 0.73 | 1.7 | 0.42 |

TABLE 1-continued

|  |  | Example 1 | Example 2 | Example 3 | Example 4 | Comparative Example 1 | Comparative Example 3 |
|---|---|---|---|---|---|---|---|
| Content of polymer having terminal double-bonds expressed by Formula (1) (mol %) |  | 84 | 92 | 97 | 99 | 100 | 90 |
| Molecular weight | Mn | 3,700 | 2,700 | 1,800 | 1,900 | 2,100 | 2,300 |
|  | Mw | 11,100 | 6,400 | 3,900 | 4,000 | 5,100 | 5,100 |
|  | Mw/Mn | 3.0 | 2.4 | 2.2 | 2.1 | 2.4 | 2.2 |
| Glass transition temperature(° C.) |  | 93 | 82 | 58 | 60 | 69 | 80 |
| Transparency | YI | 2.7 | 2.2 | 3.4 | 2.9 | 8.3 | 2.3 |
| Methacrylic acid ester polymer |  | AP-1 | AP-2 | AP-3 | AP-4 | AP-5 | AP-6 |

As found from Table 1, in the case of initiating polymerization after adjusting the pH of the aqueous suspension to the range of 1 to 5, a polymer of little coloring was obtained having low Mw at 3900 to 11100, and YI of 2.2 to 3.4, (Examples 1 to 4).

On the other hand, in the case of initiating polymerization without adjusting the pH of the aqueous suspension to the range of 1 to 5 and the pH remaining at 7.3, although Mw was a low molecular weight at 5100, YI was high at 8.3, and thus was colored to yellow (Comparative Example 1).

Example 5

Each raw material was mixed in the blending proportion shown in Table 2 to prepare an active energy ray-curable resin composition.

On one face of an optical disk support substrate made of polycarbonate resin (12 cm diameter, 1.1 mm thickness, 0° warp angle), a film of $Ag_{98}Pd_1Cu_1$ (atomic ratio) alloy was made so as to be 20 nm film thickness by the sputtering method, whereby an optical disk substrate for evaluation having a silver alloy reflective film on the mirror surface was obtained (0° warp angle).

On the silver alloy reflective film of the obtained optical disk substrate for evaluation, the active energy ray-curable resin composition was coated using a spin coater under an environment of 23° C. ambient temperature, 50% relative humidity in air. Furthermore, ultra-violet rays were irradiated from above the coated surface using a high-voltage mercury light at an energy amount of 1500 mJ/cm$^2$ integral light (measured with UV actinometer, model UV-351SN, manufactured by ORC MANUFACTURING CO., LTD.) to cause the active energy ray-curable resin composition to cure, thereby obtaining an optical recording model medium for evaluation having a cured product layer with an average film thickness of 100 μm. The evaluation results are shown in Table 2.

Examples 6 to 14

Except for using the active energy ray-curable resin compositions described in Table 2 as the active energy ray-curable resin composition, optical recording model media for evaluation were obtained by the same method as Example 5. The evaluation results are shown in Table 2.

Comparative Example 2

Except for using the active energy ray-curable resin composition described in Table 2 as the active energy ray-curable resin composition, the optical recording model medium for evaluation was obtained by the same method as Example 5. The evaluation results are shown in Table 2.

For Comparative Example 2, although the low warping property was favorable, the hardness was inferior due to using urethane acrylate without use of methacrylic acid ester polymer.

Comparative Example 3

Except for changing the 100 parts of methyl methacrylate to a mixture consisting of 92 parts of methyl methacrylate and 8 parts of methacrylic acid, methacrylic acid ester polymer (AP-6) was produced by the same method as Comparative Example 1.

Except for using (AP-6) in place of (AP-2) as the methacrylic acid ester polymer, the optical recording model medium was obtained by the same method as Example 5. The evaluation results are shown in Table 2.

For Comparative Example 3, the high-temperature and high-humidity resistance (corrosiveness) was inferior due to using methacrylic acid ester polymer (AP-6) having an acid value of 52.1 mg KOH/g.

TABLE 2

|  |  |  |  | Example 5 | Example 6 | Example 7 | Example 8 | Example 9 | Example 10 | Example 11 |
|---|---|---|---|---|---|---|---|---|---|---|
| Active energy ray-curable resin composition (parts by mass) | Methacrylic acid ester polymer |  | AP-2 | 25 | 25 | — | 25 | 25 | 15 | 25 |
|  |  |  | AP-3 | — | — | 40 | — | — | — | — |
|  |  |  | AP-6 | — | — | — | — | — | — | — |
|  | Radical-polymerizable compound | Compound having at least two (meth)acryloyl groups per molecule | FA324A | 50 | — | — | — | 50 | 50 | 50 |
|  |  |  | FAP324A | — | 50 | — | — | — | — | — |
|  |  |  | TMP3P | — | — | 30 | — | — | — | — |
|  |  |  | FA220 | — | — | — | 50 | — | — | — |
|  |  |  | TCDDA | — | — | — | — | — | — | — |
|  |  |  | R604 | — | — | — | — | — | — | — |
|  |  |  | TMP6E | — | — | — | — | — | — | — |

TABLE 2-continued

| | | | | | | | | | | |
|---|---|---|---|---|---|---|---|---|---|---|
| | | Compound having one (meth)acryloyl group per molecule | THFA | 25 | 25 | 30 | 25 | — | — | — |
| | | | PEA | — | — | — | — | 25 | 35 | — |
| | | | MEDA | — | — | — | — | — | — | 25 |
| | Photopolymerization initiator | | HCPK | 4 | 4 | 4 | 4 | 4 | 4 | 4 |
| | Other | | UA | — | — | — | — | — | — | — |
| | | | APMA | 0.05 | 0.05 | 0.05 | 0.05 | 0.05 | 0.05 | 0.05 |
| Evaluation results | Total | | | 104.05 | 104.05 | 104.05 | 104.05 | 104.05 | 104.05 | 104.05 |
| | Low warping property (warp angle °) | | | −0.15 | −0.18 | −0.19 | −0.18 | −0.19 | −0.20 | −0.13 |
| | Martens hardness(N/mm$^2$) | | | 114 | 118 | 106 | 54 | 132 | 119 | 118 |
| | High-temperature and high-moisture resistance (corrosiveness) | | | ○ | ○ | ○ | ○ | ○ | ○ | ○ |

| | | | | Example 12 | Example 13 | Example 14 | Comparative Example 2 | Comparative Example 3 |
|---|---|---|---|---|---|---|---|---|
| Active energy ray-curable resin composition (parts by mass) | Methacrylic acid ester polymer | | AP-2 | 25 | 25 | 25 | — | — |
| | | | AP-3 | — | — | — | — | — |
| | | | AP-6 | — | — | — | — | 25 |
| | Radical-polymerizable compound | Compound having at least two (meth)acryloyl groups per molecule | FA324A | — | — | — | — | 50 |
| | | | FAP324A | — | — | — | — | — |
| | | | TMP3P | — | — | — | 30 | — |
| | | | FA220 | — | — | — | — | — |
| | | | TCDDA | 50 | — | — | — | — |
| | | | R604 | — | 50 | — | — | — |
| | | | TMP6E | — | — | 50 | — | — |
| | | Compound having one (meth)acryloyl group per molecule | THFA | 25 | 25 | 25 | 30 | 25 |
| | | | PEA | — | — | — | — | — |
| | | | MEDA | — | — | — | — | — |
| | Photopolymerization initiator | | HCPK | 4 | 4 | 4 | 4 | 4 |
| | Other | | UA | — | — | — | 40 | — |
| | | | APMA | 0.05 | 0.05 | 0.05 | 0.05 | 0.05 |
| Evaluation results | Total | | | 104.05 | 104.05 | 104.05 | 104.05 | 104.05 |
| | Low warping property (warp angle °) | | | −0.25 | −0.26 | −0.18 | −0.19 | −0.16 |
| | Martens hardness(N/mm$^2$) | | | 132 | 129 | 102 | 44 | 115 |
| | High-temperature and high-moisture resistance (corrosiveness) | | | ○ | ○ | ○ | ○ | x |

It should be noted that the abbreviations in Table 2 indicate the following compounds. FA324A: di(meth)acryloyl polyethoxylated bisphenol A (trade name: FANCRYL FA-324A, manufactured by Hitachi Chemical Co., Ltd.)

FAP324A: di(meth)acryloyl polypropoxylated bisphenol A (trade name: FANCRYL FAP-324A, manufactured by Hitachi Chemical Co., Ltd.)

TMP3P: trimethylolpropane triacrylate modified by 3 propylene oxides per molecule (trade name: New Frontier TMP-3P, manufactured by Dai-Ichi Kogyo Seiyaku Co., Ltd.)

FA220: polyethylene glycol diacrylate (trade name: FANCRYL FA-220, manufactured by Hitachi Chemical Co., Ltd.)

TCDDA: tricyclodecane dimethanol diacrylate (trade name: Light Acrylate DCP-A, manufactured by Kyoeisha Chemical Co., Ltd.)

R604: neopentyl glycol-modified trimethylolpropane diacrylate (trade name: Kayalate R-604, manufactured by Nippon Kayaku Co., Ltd.)

TMP6E: trimethylolpropane triacrylate modified by 6 ethylene oxides per molecule (trade name: Aronix M-360, manufactured by Toagosei Co., Ltd.)

UA: bifunctional urethane acrylate obtained in Production Example 6

THFA: tetrahydrofurfuryl acrylate (trade name: Biscoat #150, manufactured Osaka Organic Chemical Industry Ltd.)

PEA: phenoxyethyl acrylate (trade name: New Frontier PHE, manufactured by Dai-Ichi Kogyo Seiyaku Co., Ltd.)

MEDA: 2-ethyl-2-methyl-1,3-dioxolan-4-yl-methyl (meth)acrylate (trade name: MEDOL-10, manufactured by Osaka Organic Chemical Industry Ltd.)

HCPK: 1-hydroxycyclohexyl-phenyl ketone

APMA: 2-methacryloyloxyethyl acid phosphate (trade name: Kayamer PM-2, manufactured by Nippon Kayaku Co., Ltd.) It should be noted that APMA is an adhesion-imparting agent to metals.

INDUSTRIAL APPLICABILITY

The methacrylic acid ester polymer of the present invention is suited to coating and ink applications, and particularly to resins for organic solvent-type coatings with high solids content, resins for solvent-free coatings, resins for photo-curable coatings, resins for powder coating, etc. In addition, the methacrylic acid ester polymer of the present invention is adaptable to environmental conservation-type coatings for low VOC provision, due to retaining low viscosity even if dissolved at high concentration in organic solvent and vinyl monomer, and thus excelling in coatability. Due to little coloring and the transparency being high, it is further adaptable to a wide range of applications such as transparent members in the above-mentioned applications, optical recording media, transparent automotive members and transparent members for displays.

The invention claimed is:

1. A method for producing a methacrylic acid ester polymer by suspension polymerizing methacrylic acid ester monomer in an aqueous medium, the method comprising:
preparing an aqueous suspension comprising water, a methacrylic acid ester monomer, and a transition metal chelate complex and adjusting a pH of the aqueous suspension by a pH adjuster which is a non-radical polymerizable acid free of radical polymerizable functional groups to a pH range of 2.4 to 4.9; and
subsequently suspension polymerizing the methacrylic acid ester monomer, to obtain the methacrylic acid ester polymer,
wherein the methacrylic acid ester polymer produced by the suspension polymerizing has (i) an acid value of no higher than 0.5 mgKOH/g, and (ii) a transition metal content of no higher than 0.73 ppm, and (iii) a mass average molecular weight of the methacrylic acid ester polymer produced is 3900 to 11000,
wherein the transition metal chelate complex is of Formula (2) and is used in the aqueous suspension in an amount of 0.005 to 0.02 parts by mass relative to 100 parts by mass of the methacrylic acid ester monomer:

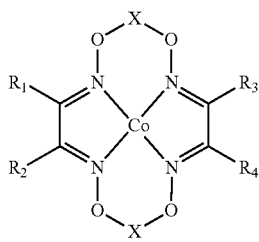

(2)

wherein $R_1$ to $R_4$ may each be the same or different, and represent a hydrogen atom, C6 to C12 aryloxy group, C1 to C12 alkyl group or C6 to C12 aryl group, and each X may be the same or different, each X is selected from the group consisting of H, $BF_2$, $BCl_2$, $BBr_2$ and $B(Y)2$, where Y is a substituent selected from the group consisting of an OH group, C1 to C12 alkoxy group, C6 to C12 aryloxy group, C1 to C12 alkyl group and C6 to C12 aryl group, wherein the non-radical polymerizable acid is selected from the group consisting of inorganic acids and organic acids, wherein the inorganic acid is hydrogen bromide, hydrogen iodide, sulfuric acid, phosphoric acid or nitric acid, and the organic acid is formic acid, acetic acid, propanoic acid, hydroxyacetic acid, lactic acid, pyruvic acid, glycolic acid, malonic acid, oxalic acid, benzene-sulfonic acid, toluene-sulfonic acid, methane-sulfonic acid, trifluoroacetic acid, succinic acid, malic acid, tartaric acid, citric acid, salicylic acid, p-aminosalicylic acid, benzoic acid or ascorbic acid; and wherein a yellow index (YI) value of the methacrylic acid ester polymer produced is no more than 4.

2. The method according to claim 1, wherein the methacrylic acid ester polymer produced by the suspension polymerizing comprises at least 80% by mole of a polymer having a terminal double-bond structure expressed by Formula (1),

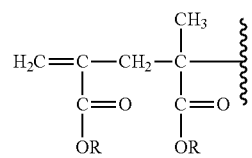

(1)

wherein R in the Formula (1) indicates an alkyl group, a cycloalkyl group or an aryl group.

* * * * *